US008206527B2

(12) United States Patent
Strunk

(10) Patent No.: US 8,206,527 B2
(45) Date of Patent: Jun. 26, 2012

(54) METHOD FOR COLD FILM TRANSFER WITH DYNAMIC FILM TENSIONING

(75) Inventor: Detlef Strunk, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 171 days.

(21) Appl. No.: 12/732,411

(22) Filed: Mar. 26, 2010

(65) Prior Publication Data

US 2010/0243126 A1 Sep. 30, 2010

(30) Foreign Application Priority Data

Mar. 26, 2009 (DE) ........................ 10 2009 014 419

(51) Int. Cl.
*B32B 41/00* (2006.01)

(52) U.S. Cl. ........... 156/64; 156/233; 156/234; 156/238

(58) Field of Classification Search .................... 156/64, 156/230, 233, 234, 238, 239, 240, 361, 367, 156/540
See application file for complete search history.

(56) References Cited

U.S. PATENT DOCUMENTS 5,486,254 A * 1/1996 Gallagher et al. ............ 156/229
6,334,248 B1 1/2002 Gallagher
6,491,780 B2 12/2002 Gallagher
8,100,160 B2 1/2012 Franzen et al.
2001/0047582 A1* 12/2001 Gallagher ....................... 29/740
2009/0078137 A1* 3/2009 Yamashita et al. ............ 101/217
2009/0294038 A1 12/2009 Jurkewitz et al.
2010/0236699 A1* 9/2010 Nakamura et al. ............ 156/238

FOREIGN PATENT DOCUMENTS

EP 0 932 501 A1 8/1999

* cited by examiner

*Primary Examiner* — George Koch

(74) *Attorney, Agent, or Firm* — Laurence A. Greenberg; Werner H. Stemer; Ralph E. Locher

(57) ABSTRACT

A cold film transfer method with dynamic film tensioning guides a film web intermittently through a transfer nip with dancers to use less film web. The intermittent drive and action of a transfer cylinder channel result in undesired fluctuations in film tension or web force, which directly affect dancer motors. A control system is used to avoid high loads on the motors and the web. A control circuit acts on the dancer movement, a first process variable is mapped in the control circuit and the first process variable is a function of a force acting on the dancers as a result of the transfer film or is a function of the actual current movement profile of the dancers. A measure for web tension is calculated as a function of the first process variable and/or the amplitude of the web tension is at least limited by the control system.

13 Claims, 7 Drawing Sheets

METHOD FOR COLD FILM TRANSFER WITH DYNAMIC FILM TENSIONING

CROSS-REFERENCE TO RELATED APPLICATION

This application claims the priority, under 35 U.S.C. §119, of German Patent Application DE 10 2009 014 419.6, filed Mar. 26, 2009; the prior application is herewith incorporated by reference in its entirety.

BACKGROUND OF THE INVENTION

Field of the Invention

The present invention relates to a method for the at least partial transfer of a transfer layer from a transfer film onto a printing material, in which the transfer film and the printing material are guided together through a transfer nip and the transfer layer is released from a carrier layer of the transfer film under the action of pressure and is transferred onto the printing material. The transfer film is unwound from a supply reel and is guided to the transfer nip through at least one first actuating element in front of the transfer nip in a movement direction of the transfer film. The first actuating element substantially follows a predefined movement profile and has an active effect on the transfer film in such a way that an advancing speed of the transfer film is at least intermittently varied.

Film transfer apparatuses of the generic type are used in the finishing of printed products, for example in order to produce gloss effects. Machines of that type can be divided into hot embossing film machines and cold film embossing machines. In the latter, the transfer layer is transferred onto a printing material, such as a paper sheet, merely under pressure, but not additionally under the action of heat. As a rule, in cold film embossing machines with a printing unit which is positioned in front of the transfer apparatus, adhesive is printed, with the result that a printed image made from adhesive remains on the sheet. That printed image made from adhesive can pull a transfer layer from the transfer film used within the film transfer unit, with the result that the transfer layer adheres on the sheet in regions. In that way, in the transfer nip under the action of pressure, the transfer layer can be transferred from the transfer film partially onto the printing material in the regions to which adhesive is applied.

If the printing material which is used is sheet-shaped printing material or if the transfer layer is to be transferred onto the printing material only in regions, with the result that regions of the transfer layer which are always separated from one another in the film advancing direction are to be transferred onto the printing material, it is known to synchronize the movement of the transfer film as a function of the regions of the transfer film to be transferred, in order to counteract the consumption of unused transfer film. Thus, for example, European Patent EP 0 932 501 B1, corresponding to U.S. Pat. Nos. 6,334,248 and 6,491,780, proposes dancer rollers which are coupled to one another and around which the transfer film is guided. The dancer rollers are advanced and withdrawn synchronously with respect to one another as a function of transfer-free regions of the printing material. In that case, a predefined movement profile, in particular of the dancer roller which is disposed between the unwinding device and the transfer nip, determines the storage and dispensing function of the transfer film. The transfer film is then advanced together with the dancer rollers and withdrawn in the transfer nip, with the result that the speed of the transfer film is varied.

It is decisive in that case that the speed of the transfer film during the transfer operation is to correspond to the speed of the printing material and, in a non-transfer region, the transfer film is to be at least braked, but ideally withdrawn to such an extent that that region of the transfer film layer which has not yet been transferred is available completely for a new transfer operation.

In the case of film synchronization of that type and, in particular, in the case of the use of a printing unit of a sheet-fed offset printing press as film transfer unit, dynamic changes in the web tension occur.

Thus, German Published, Non-Prosecuted Patent Application DE 10 2008 025 285 A1, corresponding to U.S. application Ser. No. 12/472,410, filed May 27, 2009, describes a film transfer apparatus in a sheet-fed offset printing unit, in which two dancers are advanced and withdrawn for synchronizing the film and in each case one advancing device is provided in front of the dancer configuration before the transfer nip and behind the dancer configuration after the transfer nip. Through the use of the advancing device, the film is pulled off from the supply reel or is pulled to the collecting reel of the film transfer module. The web tensions are to be able to be regulated correspondingly before and after the transfer nip through the advancing devices. In the case of the use of the blanket cylinder of an offset printing unit of a sheet-processing machine, the problem is additionally produced that there is a channel in that case in the blanket cylinder, in which the tension of the film falls and suddenly rises again. Reference is made to German Published, Non-Prosecuted Patent Application DE 10 2008 025 285 A1, corresponding to U.S. application Ser. No. 12/472,410, filed May 27, 2009, for a corresponding description of that problem and the construction of a corresponding apparatus with an advancing device.

As a result of that dynamic action on the transfer film, substantially alternating falling and rising of the web tensions before and after the transfer nip occur during the synchronization, as a result of the transfer film falling into the channel and subsequent tautening at the end of the channel due to the friction between the transfer film and the rubber blanket. In addition, the geometrical length of the wraparound is not constant there in the given configuration. Moreover, the web tension is influenced at the deflection points for web guidance. If that variation in the web tension per se cannot be controlled, fluttering of the film web occurs, which can lead to problems, in particular, in the case of a sheet-processing machine in the region of the grippers of the back-pressure cylinder, since the grippers can come into contact in that way with the fluttering web. No less damaging is the fact that overstretching of the web can result in damage to its coating.

SUMMARY OF THE INVENTION

It is accordingly an object of the invention to provide a method for cold film transfer with dynamic film tensioning, which overcomes the hereinafore-mentioned disadvantages of the heretofore-known methods of this general type, with which impermissible tension changes in a transfer film can be detected and/or with which such changes can at least be counteracted.

With the foregoing and other objects in view there is provided, in accordance with the invention, a method for the at least partial transfer of a transfer layer from a transfer film onto a printing material, in which method the transfer film and the printing material are guided together through a transfer nip and the transfer layer is released from a carrier layer of the transfer film under the action of pressure and is transferred onto the printing material. The transfer film is unwound from a supply reel and is guided to the transfer nip through at least one first actuating element in front of the transfer nip in the movement direction of the transfer film and/or is transported away from the transfer nip through at least one second actuating element behind the transfer nip in the movement direction of the transfer nip. The first actuating element substantially follows a predefined movement profile and has an active effect on the transfer film in such a way that the advancing speed of the transfer film is varied at least intermittently and/or the second actuating element is adjusted as a function of the web movement. According to the invention, a control system, including a control circuit, acts on the movement profile of the first and/or second actuating element, a first process variable is mapped in the control circuit, the first process variable is a function of the force which acts on the first and/or second actuating element as a result of the transfer film or is a function of the actual current movement profile of the actuating element, and a measure of the web tension is calculated as a function of the first process variable and/or the amplitude of the web tension is at least limited by the control system.

There is provision in this case for a control circuit to act on the movement profile of the first and/or second actuating element. The control system has a control circuit and a first process variable is mapped in the control circuit. In this case, the first process variable is a function of the force (K) which acts on the actuating element as a result of the transfer film or is a function of the actual current movement profile of the actuating element.

A measure of the web tension is then to be calculated as a function of the first process variable and/or the amplitude of the web tension is to at least be limited by the control system.

Since the control circuit is that control circuit for controlling the movement profile of the actuating element, according to the invention existing control systems, possibly with additions, can advantageously continue to be used. In terms of the method, it is sufficient to determine the first process variable of the control circuit. The first process variable can then be used as a measure of the web tension.

In order to achieve the movement profile of the actuating element, which is predefined for the synchronization, a control system with setpoint value generation and a control circuit is already provided in this case, with the actuator of the control system being loaded with the actuating variable from the controller output. In rotary systems, the actuating variable is a torque. The control system includes the actuator including power amplification and an actuating element, and coupling elements for the translatory movement of the dancer roller. According to the invention, the elements of the already existing control system can therefore continue to be used.

Depending on the requirement of accuracy and time response of the replacement variables calculated for the web tension, the procedure is complicated to a varying extent. According to the invention, the object is achieved by way of two methods which are complicated to a varying extent.

In the less complicated variant, an analytical calculation of the web tension from the transfer functions of the control device and the control system can be used as a configuration which saves computing time. With increased complexity, the web tension can be calculated with the aid of a more complicated estimating method using a so-called Luenberger observer or identity observer. A modification of this observer is the so-called Kalman filter. In both cases, the design processes are known in control technology. Both estimating methods are suitable for achieving the described objects. The further embodiments relate to an identity observer which will be called simply an observer in the following text.

The design process itself will not be discussed in greater detail herein.

In this case, only the indication that satisfactory results are achieved by way of the simplest method of so-called pole presetting is to suffice.

For the analytical calculation of the web tension, the control system can be described with the differential equations of the rotary angles and their derivations in relation to the degrees of freedom of the actuator and including a measure of the web tension. The overall transfer function which is determined in this way contains the proportions which describe the effects of the actuating moment at the actuator and disturbance variable at the dancer roller. After being inserted into one another, the associated transfer functions supply the rotary angle at the actuator as a function of the moments at the actuator and the dancer roll, the latter with an influence on the rotary angle at the actuator.

In this case, a conventional dancer drive is assumed which is controlled by way of a rotary encoder on the motor which represents the actuator.

With the inclusion of the control device, finally the rotary angle at the actuator can be eliminated with the structure information of the closed loop control circuit and the transfer functions of the controller cascade, including angle and rotational speed controller.

With the inclusion of the control parameters, the transfer function for the disturbance moment at the dancer roll and therefore the web tension are obtained as a function of the actuating moment of the controller.

In the calculation, the numerator degree is greater than the denominator degree as a result of inversion of a transfer function. As a result of this, differentiating proportions occur which lead to a numerical instability.

This can be prevented by PT1 filters or other filters, with the denominator degree being adapted to the numerator degree and the settling time of the value determined in this way for the web tension being extended.

In practice, no disadvantages are produced therefrom for the given application. It is even possible under further restrictions to omit one or more proportions with differentiating elements.

In accordance with another mode of the invention, the first process variable is calculated as a function of a disturbance variable. The first disturbance variable is a disturbance variable of the control circuit and the disturbance variable is a function of the web tension itself or at least of changes in the web tension of the transfer film. According to the invention, an evaluation variable which represents a measure of the web tension of the transfer film is then derived as described above from the first process variable which is determined in this way. In this case, the process variable can therefore be an estimated variable for the real web tension as a disturbance variable or for changes in the real web tension.

In addition to customary cascade control or other control methods, the control system has pilot control operations for inertia forces, gravitational forces and frictional forces. The pilot control operations are set by way of the parameters of the control system which can be considered to be substantially deterministic. Automatic setting operations in conjunction with learning rungs of modern drive units facilitate this task.

The control system is actuated by way of the sum of the actuating moments from control operation and pilot control operations.

Assisted by pilot control operations, the actuating moments at the controller output itself remain small, as long as no disturbance variable is acting, since only inaccuracies in the pilot control operations have to be compensated for. The action of the transfer film on the control system is then considered to be a disturbance variable and significant effects on the actuating moment occur as a result of control deviations.

In accordance with a further mode of the invention, a measure of the web tension is determined as a function of the first process variable, with a dynamic and/or static proportion of the web tension being determined.

A more complex embodiment of the method according to the invention is realized by way of an estimating method which supplies accurate and undelayed results, without the problem of the transfer function with differentiating proportions being produced.

Using the observer, the web tension can be calculated from the estimated values for the state variables of the system model.

The observer maps a system model in the computer, the estimated values of which for the angles of the actuator and the dancer roll and their derivations represent approximations of the actual values.

The web tension can be calculated directly from the estimated values with the aid of the known system parameters for the inertia of the dancer, and damping and spring constant of the coupler mechanism of actuator and dancer roll. For this purpose, the rotary angles and their derivations are replaced by the corresponding estimated values of the observer in the inhomogeneous differential equation of the dancer moments and the exciting moment as a result of the web tension which forms the basis of the system model.

A common feature of all of the methods is that this determination takes place substantially without sensors. As a result, additional sensor systems can advantageously be omitted, An additional system in the form of typical sensing rolls would also always produce interactions with the film web itself. Impairment of this type of the web tension by a sensor can therefore be avoided according to the invention.

In accordance with an added mode of the invention, a setpoint value for the movement profile of the actuating element is predefined in the control system and, furthermore, an evaluation variable is derived with the aid of the described methods. The evaluation variable is a measure at least of the dynamic proportion of the web tension, the evaluation variable is compared with a reference variable and the setpoint value and/or a change in the setpoint value is adapted as a function of the result of the comparison.

This can happen by modification of the web curve for the setpoint values of the movement profile of the actuating element, by the web curve having superimposed on it, in the region of greatly rising web tension, a sinusoidal curve, for example, the amplitude of which is adapted to the determined web tension. It is to be noted in this case that a reduced gradient in the setpoint value curve should be compensated for by an increased gradient in a phase with low web tension, in order not to reduce the saving potential. To this extent, this compensation can also take place before the occurrence of increased web tension, but in any case outside the phase of the transfer of the transfer layer.

In this way, it is advantageously not necessary to obtain precise values for the web tension as an evaluation variable, but it is rather sufficient to predefine a limiting value for the desired web tension. It is enough to derive an evaluation variable, which changes, which then lies above a reference variable, correspondingly incorporated into amended stipulations for the setpoint value or for changes in the setpoint value per se. In this way, the movement profile of the actuating elements are adapted through the stipulations of the setpoint value as a function of the comparison of the evaluation variable with the reference variable, in such a way that no damage or reduction in quality occurs due to a dynamic change in the web tension.

In particular, the control system can be adapted in such a way that all known physical process variables, such as friction of the actuating elements or the drives for the actuating elements or friction of the film with and on the actuating elements and on the transfer cylinder and/or in the transfer nip or on further deflection elements, are combined into pilot control variables for the control circuit to such an extent that only the interaction between the actuating elements and the film remains as a remaining disturbance variable of the control circuit, with the result that this disturbance variable is used as an important variable for the actuating moment of the control circuit. In this case, the control system is to be understood in such a way that it includes at least the control circuit and the pilot control device itself. The actuating moment of the control circuit is then directly dependent on the film force which acts on the actuating elements, with the film force being directly dependent on the film tension. Changes in the actuating moment are therefore then also proportional to or at least dependent on changes in the film tension, and can be tapped off within the control circuit and used for evaluating the evaluation variable.

In accordance with an additional mode of the invention, the control circuit can, in particular, be a cascade controller which serves to control the movement profile of dancer rollers for synchronizing the transfer film as actuating elements.

In accordance with yet another mode of the invention, there is provision for an estimated value of the first process variable to be determined by an observer, for the estimated values of the observer to be fed further, in order to determine a modified setpoint value, to a filter element for applying at least one filter function and/or one transfer function, and for the modified setpoint value to result in a change in the movement profile of the first actuating element, with the result that the web tension does not exceed a predefined limiting value.

In accordance with yet another alternative mode of the invention, the method is configured in such a way that an actuating element system includes at least the first actuating element, a second actuating element behind the transfer nip in the movement direction of the film, and the drive motor of the actuating element or elements, the transfer film and mechanical connection and transfer elements between the actuating elements, drive motor (N) and transfer film. The first process variable is then to be determined with the aid of an observer. The observer is, for example, the Luenberger observer which is known from control technology. That observer is then used to determine at least one estimated value for state variables from the set including angular velocity and angle of, in each case, one of the elements drive motor and shaft of the actuating elements and transfer film of the actuating element system. Furthermore, a rotary encoder is to be provided in the region of the drive motor or the drive motors of the actuating elements. The rotary encoder is then used to determine values for the rotary angle of the drive motor or the drive motors. Furthermore, an actuating variable of a controller of the control circuit of the control system is to be transferred to the observer and, furthermore, the estimated values of the state variables are to be determined by the observer under consideration of the values of the rotary encoder, the actuating variable and a model of the mechanics of the actuating element system. The estimated values which are determined in this way are then to be fed as predefined setpoint values to the controller of the control circuit, and finally the fluctuations in the force action of the film at least on the second actuating element are to be minimized.

In this way, precisely the state variables are transferred as setpoint values to the control circuit by the observer under consideration of the physical properties of the different constituent parts of the actuating element system. The movement of the actuating elements is modeled in the observer, with setpoint values and actual values being used, from which the observer determines the state variables of the movements. Starting from these state variables which act as internal setpoint values and actual values of the controller, actuating variables are generated, with the result that practically no force reaction effect of the film on the actuating elements occurs, as a result of which the fluctuations in the force action of the film at least on the second actuating element can be directly minimized. An estimating method is likewise used in this alternative method for carrying out the object of the invention, with the system model which forms the basis of the observer being extended decisively. According to the invention, the reaction effect of the transfer film is now no longer considered to be a disturbance variable, but rather the reaction effect itself is processed as a process variable. The aim in this case is to actuate a control circuit, by way of which the dancer follows the film movement, in such a way that the dancer movement is brought about only from the film movement substantially without further external setpoint values and, in particular, also without further sensors.

With the inclusion of the reaction effect of the transfer film on the dancer in the system model, this object is achieved by using further control functions, in particular the estimating method in the form of the observer which supplies, in particular, the setpoint value for the dancer position, without further external stipulations being required. In the ideal case, the dancer follows with minimized force reaction effect of the transfer film.

Inventively, transfer film is included in the system model of the observer as concentrated mass with flexible coupling to the dancer roll. This form of modeling can be performed without problems if the structural features of the configuration are taken into consideration. In particular, the extent of extension is to be estimated, with the length thereof and the ground layer of the transfer film supplying the decisive parameters.

Since the force which reacts on the dancer counters a minimum value, the film itself can be modeled simply with effective substitute values for the spring constant and the concentrated mass from the extent of extension and the ground layer of a given configuration. For the application, the customary approximation calculations in mechanics can be used, such as ⅓ of the overall mass of a spring as a concentrated mass.

The method is not sensitive to parameter fluctuations, with which the film is modeled, because their force action on the dancer roll assumes a minimum after a short settling time: the limiting value tends toward zero independently of the parameters, because it is a controlled system.

Moreover, no knowledge or assumptions about the movement of the film need be present, because no presuppositions have been made in this regard during the construction of the control system.

The dynamically reactive forces are therefore minimized under universal usability.

For control purposes, a conventional cascade controller is used, for example, which controls the difference toward zero of the state variables which are supplied by the observer for the film and dancer position, by these positions being transferred to the cascade controller as setpoint value and actual value. For pilot control and therefore in order to improve the control, moreover, the derivations of the positions which the observer likewise supplies are fed to the control cascade. At least the speed can therefore also be controlled.

A significant web tension is required as a rule for disturbance-free film transport, in order to achieve quiet running of the web. For this purpose, the inventive structure of the control system makes it possible to stipulate the desired web tension.

Independently of other process variables of the control system, the predefined force for generating the web tension can be engrained in the control system, in such a way that this force is superimposed as offset on the minimized dynamic forces.

The web tension can therefore be brought within wide limits to the predefined value, without the web tension having to be measured explicitly, with the dynamic forces being minimized.

In accordance with yet a further mode of the invention, a value for the web tension of the transfer film as offset is predefined as a reference variable of the control system. In this way, the web tension can be superimposed on the minimized fluctuations as a constant force action of the second actuating element on the film. If first of all the fluctuations are minimized, a preferred web tension can advantageously be predefined or set in this way.

In accordance with yet an added mode of the invention, a dynamic profile is predefined for this offset, in order to adapt the current web tension to the actual conditions within the transfer unit during the film transfer.

In accordance with yet an additional alternative mode of the invention, it is possible independently of one another that the drive motor of the actuating element system or the drive motors is/are a linear motor, since a linear position encoder is provided instead of a rotary encoder, and that the velocity and position of the actuating elements are estimated or determined instead of angular velocities and/or angles.

In accordance with a concomitant mode of the invention, in order to minimize the requirement of the method according to the invention and the associated control circuits, there is further provision according to the invention for this minimization of the web tension fluctuations or a stipulation of an offset of the web tension to advantageously take place exclusively in the time periods which lie outside the phases, in which the advancing velocity of the film corresponds to the velocity of the printing material in the transfer nip during the film transfer. Therefore, the method according to the invention then has to be carried out, in particular the web tension fluctuations have to be minimized or an offset predefined for the web tension, only when the film per se is synchronized.

This also ensures that an increasing discrepancy in the model calculations over time is prevented because the state variables of the model are synchronized to the real state variables of the system outside the phases of the intermittent driving. Drift of the model is thus counteracted.

If synchronization of the film does not take place, no minimization of the web tension fluctuations or stipulation of an offset takes place either.

Other features which are considered as characteristic for the invention are set forth in the appended claims.

Although the invention is illustrated and described herein as embodied in a method for cold film transfer with dynamic film tensioning, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, noting that the invention is not to be restricted to the illustrated embodiment examples, from which further features according to the invention can result.

DETAILED DESCRIPTION OF THE INVENTION

Figure 1:
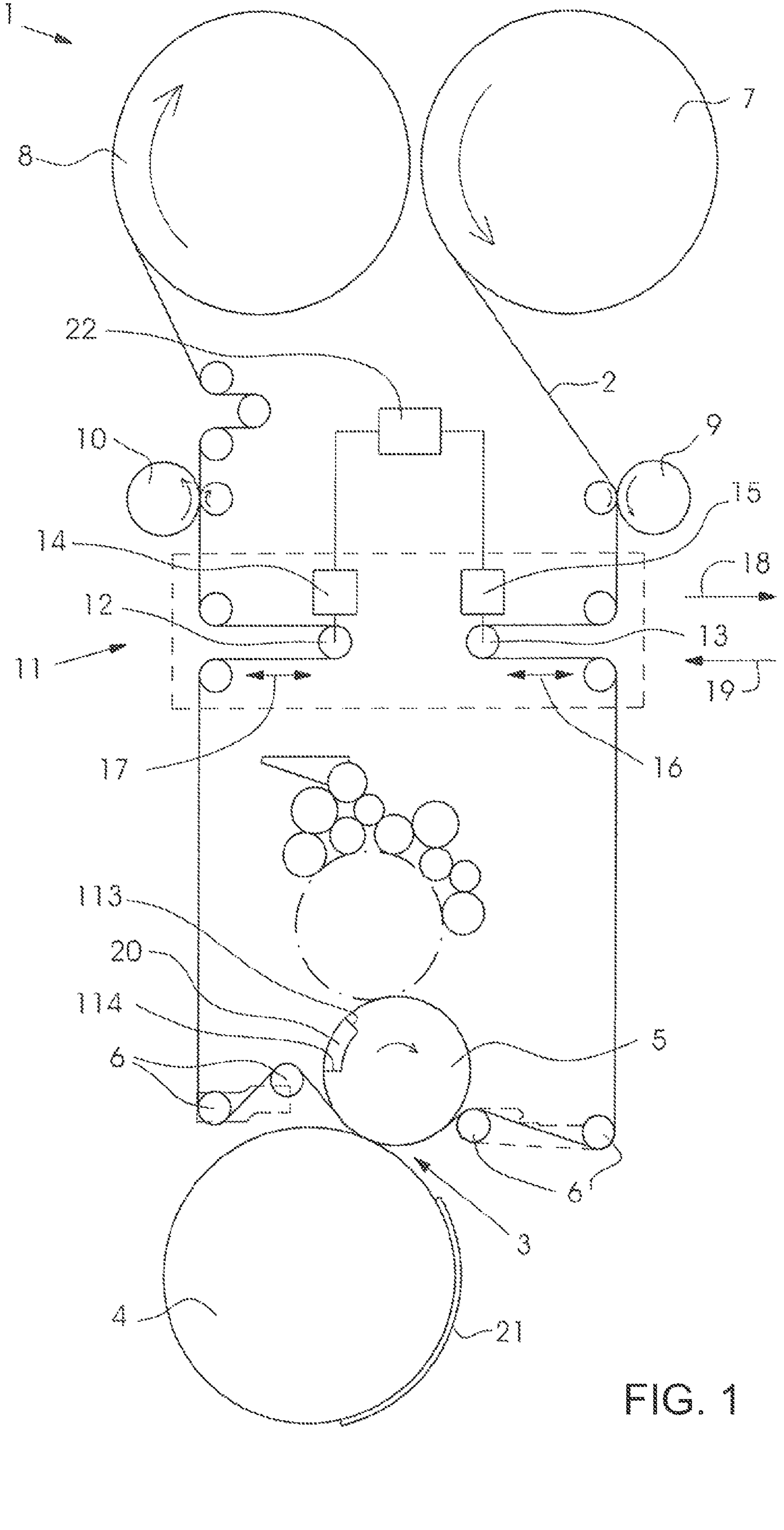
FIG. 1 is a diagrammatic, vertical-sectional view illustrating the construction of a film transfer unit with synchronization.

Referring now to the figures of the drawings in detail and first, particularly, to FIG. 1 thereof, there is seen a film transfer unit 1, in which a transfer film 2 is guided through a transfer nip 3.

The transfer nip 3 is formed by a transfer cylinder 5 and an impression cylinder 4. The transfer film 2 is unwound from a supply reel 7 and is pulled in the direction of the transfer nip 3 by a front advancing device 9. In this case, the supply reel 7 is situated on a non-illustrated friction shaft and is driven at a speed which is lower than the speed of printing material 21. The supply reel 7 is driven by a friction shaft. The transfer film 2 is pulled off from the supply reel 7 by the front advancing device 9. The front advancing device 9 has rollers being driven at a higher speed than the friction shaft of the supply reel 7. However, the front advancing device 9 is still operated at a lower speed than the speed of the printing material 21. As a result, a synchronization of the transfer film 2 is made possible for saving film material.

The unwound transfer film 2 is guided over a front dancer or first actuating element 13 of a synchronization module 11, over deflection rollers 6 and through the transfer nip 3 in such a way that it assumes a wraparound angle $\alpha$ with the transfer cylinder 5. Downstream of the transfer nip 3, the transfer film 2 is guided over further deflection rollers 6 and is fed to a rear dancer or second actuating element 12 which deflects the transfer film 2 and feeds it to a rear advancing device 10. The film 2 is steered onto a collecting reel 8 by the rear advancing device 10. The collecting reel 8 is mounted on a friction shaft which is driven more quickly than the rear advancing device. In this way, slip occurs between the friction shaft and the actual collecting reel 8. The same is true of the supply reel 7.

The printing material 21 is guided through the transfer nip 3 together with the transfer film 2 over the impression cylinder 4. During the transfer of a non-illustrated transfer layer, the transfer film 2 and the printing material 21 are at an identical speed.

The transfer cylinder 5 has a printing blanket which is not shown herein in detail but is clamped over a channel 20. The channel 20 is also provided in order for it to be possible to receive grippers on the side of the impression cylinder 4.

When a front edge 113 of the channel 20 moves into the transfer nip 3, web tension between the dancer 13 and the transfer nip 3 collapses. During the transfer of a transfer layer onto the printing material 21, a sum of the speed of the front advancing device 9 and the front dancer 13 results in the speed of the printing material 21. For this purpose, the dancer 13 is moved along a path which is indicated by a double arrow 16 in an acceleration direction 18. As a result of the contact of the front edge 113 of the channel 20 with the impression cylinder 4, the front dancer 13 is decoupled from the rear dancer 12. In order to now compensate for the collapsing web tension, there is provision for the front dancer 13 to be driven through a motor 15 in such a way that it is first of all accelerated greatly in a braking direction 19. This achieves a constant web tension in this region. For this purpose, a control device 22 acts correspondingly on the motor 15 of the front dancer 13. When the channel 20 is completely in the region of the transfer nip 3, the dancer 13 is moved in the braking direction 19 with a lower acceleration, with the result that the transfer film 2 comes to a standstill or is pulled back. As a result of the transfer film 2 being pulled back, a rise in the web tension occurs, as a result of which damage to the transfer film 2 can occur in the extreme case. The control device 22 is connected to a motor 14 of the rear dancer 12 in order to move the rear dancer 12.

Figure 2:
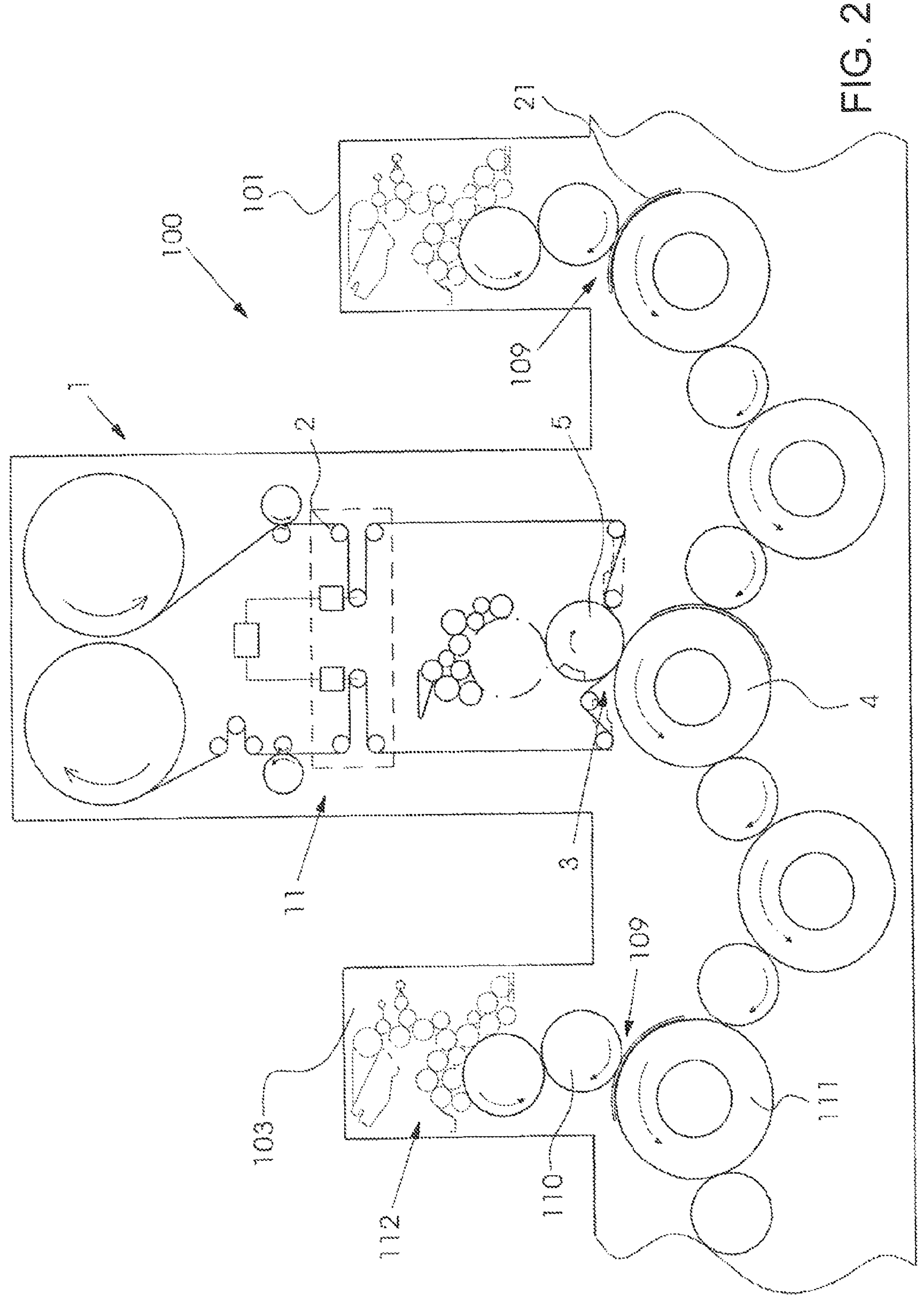
FIG. 2 is a vertical-sectional view of a film transfer apparatus with a corresponding film transfer unit.

FIG. 2 shows a portion of a film transfer apparatus 100. A film transfer apparatus 100 of this type can be installed within a printing press. A sheet 21 is transported through a press nip 109 by an application unit 101 which is a conventional printing unit of a printing press. The printing material 21 is loaded partially with adhesive in the press nip 109. The sheet 21 is then transported further through the film transfer unit 1. As described, the sheet 21 is guided through the transfer nip 3, in which it detaches the transfer layer of the transfer film 2 in those regions of the transfer film, in which it is loaded with adhesive itself.

The sheet 2, which is treated in this way, can then be transported further through the printing press, that is to say through the film transfer apparatus, in such a way that it is moved to a further adjacent printing unit 103 which again has a press nip 109 that is formed by a blanket cylinder 110 and an impression cylinder 111. Moreover, the printing unit 103 has an inking unit 112. The sheet 21, to which the transfer layer is applied, can then be overprinted conventionally in the printing unit 103.

Figure 3:
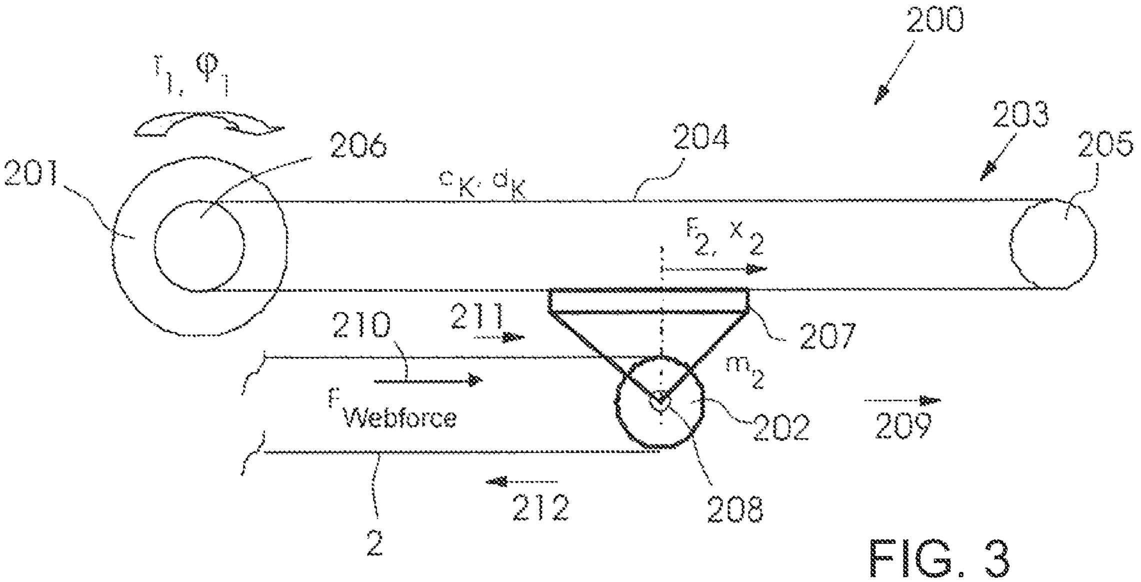
FIG. 3 is an enlarged, physical sectional view of a control system with a dancer and a film.
Figure 5:
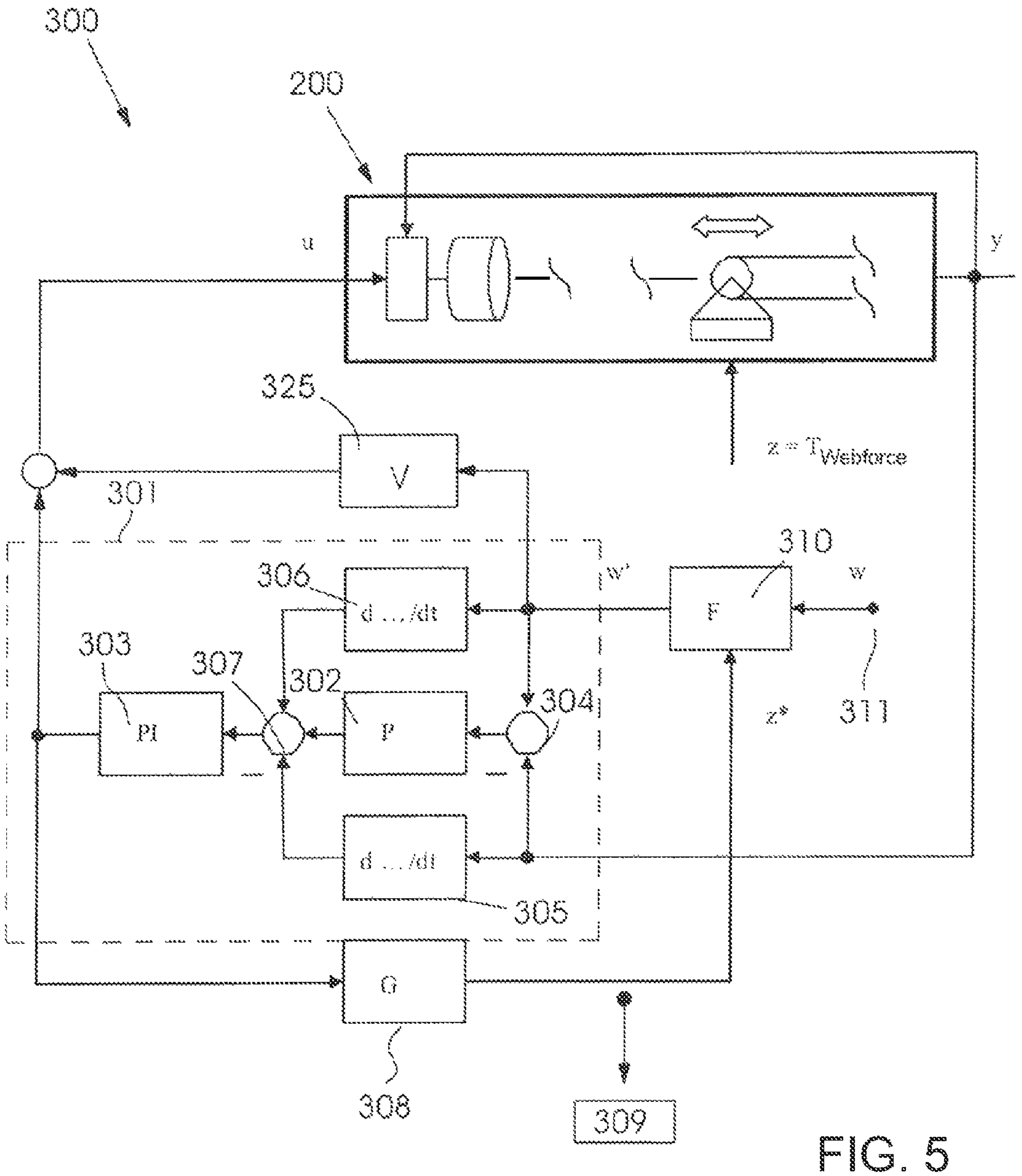
FIG. 5 is a basic block diagram of a control system for determining web tension.

FIG. 3 shows a physical illustration of a control system 200 of a regulating system 300, as shown in FIG. 5. In this case, the control system includes a drive 201 of a dancer roller 202. The dancer roller 202 is preferably a front dancer 13 of the synchronization module 11 of FIG. 1 and FIG. 2. The drive which is shown herein is therefore the motor 15. FIG. 3 is used to show, in a substantially more general way, the principle of the drive and the control system for the dancer roller 202. The drive 201 is connected to an axle 208 of the dancer roller 202 through coupling elements 203 which can include, for example, a belt 204, a deflection roller 205 and a gearwheel 206 through fastening elements 207 which are also constituent parts of the coupling elements 203. In this case, this is only an illustration of the drive and the dancer roller. A more accurate embodiment can also be configured, for example, with a linear system. The transfer film 2 is then guided around the dancer roller 202. As is shown in FIG. 1, the dancer roller 202 can be moved back and forth in the direction of the double arrow 16. If, as is shown in FIG. 3, the dancer roller is moved in a direction 209, a web force 210 which results in a corresponding web tension acts on the transfer film 2. This web force is dependent on a force $F_2$, with which the dancer roller 202 is moved in the direction 209. In the case shown herein, the lateral position of the dancer roller 202 can be described by a coordinate $x_2$. In this case, the dancer roller 202 which is moved in this way has a mass $m_2$.

In this case, a spring constant $c_K$ and a damping constant $d_K$, which represent the translatorily acting damping and the spring properties of the control system 200, are shown as process parameters of this control system 200 which includes at least the drive 201, the coupling elements 203 and the dancer roller 202.

The illustration shown herein indicates that the transfer film 2 is guided around the dancer roller 202 in the direction of arrows 211 and 212. As is shown in FIG. 1, this transfer film 2 is advanced by the film collecting reel 8 and the advancing devices 9 and 10 and possibly by the film supply reel 7. The illustration shown herein is preferably related to the front dancer 13. However, it is intended to be an illustration of the apparatus which is not meant to reproduce quantitative conditions, for example in relation to the active advancing speed and advancing direction of the transfer film 2.

Figure 4:
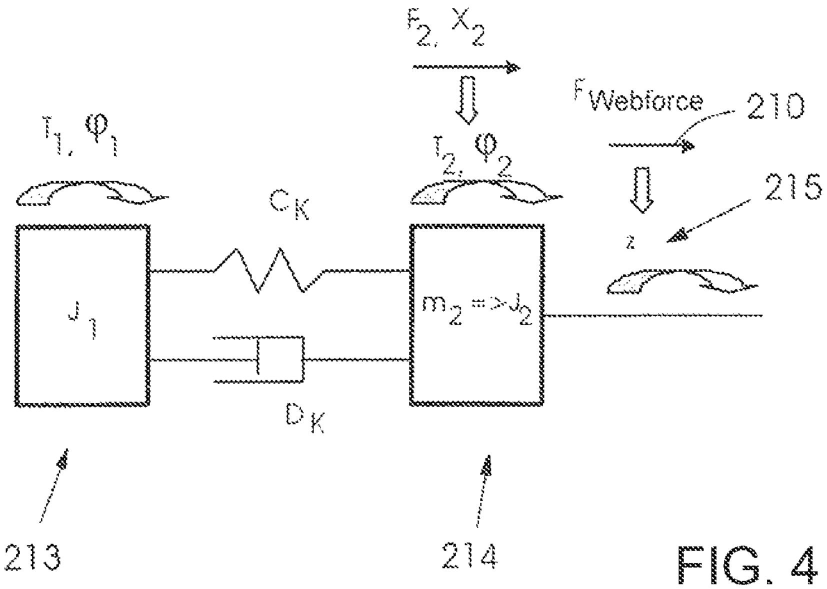
FIG. 4 is a block diagram of a physical system according to FIG. 3 in rotatory coordinates.

FIG. 4 shows an illustration of the physical system according to FIG. 3 with rotatory parameters.

In this case, the parameters which belong to the drive 201 are described through a parameter set 213 with an index 1. Instead of the mass of the drive 201, the moment of inertia $J_1$ is used herein and, furthermore, the torque $T_1$ and the angle $\phi_1$ as a position are specified. If, instead of a rotary drive, it is a linear drive, the corresponding masses and positions are valid analogously to moments of inertia $T_1$ and an angle $\phi_1$.

The dancer itself is described through a parameter set 214 about its inertia $J_2$ and its position $x_2$ and force $F_2$ are converted into torque $T_2$ and angle $\phi_2$. In general, the parameters of the dancer roller 202 are described through an index 2. The web force 210 is then described through a disturbance variable 215 as z. This indicates a value for the web tension.

The corresponding parameters $c_K$ and $d_K$ for the spring constant and damping of the linear system of the coupling elements 203 between the drive 201 and the dancer 202 are then described in rotatory coordinates as parameters $C_K$ and $D_K$.

The rotatory parameters and data determined in this way for the control system 200 are used in a regulating system 300 shown in FIG. 5, in order to be used in a control circuit 301 as parameters for a P controller 302 and a PI controller 303 for determination of an actuating variable u as an input variable for the control system 200.

The position of the dancer is determined in rotatory coordinates of the drive 201 as an actual variable y. For this purpose, a non-illustrated rotary angle transducer, which is customary for controlled drives, can be provided in the region of the drive 201.

The angular position $\phi_1$ of the drive 201 is forwarded to a differential element 304 and a differential element 305 of the control circuit 301. The differential element 304 determines the difference between the actual value of the position $\phi_1$ of the drive 201 and a reference variable W' which is predefined into the control circuit 301 as a setpoint value for the position as a function of time of the drive 201 in coordinates $\phi_1$. The speed of the drive 201 or of the dancer roller 202 is determined through the differential element 305, while the corresponding speed is determined as a setpoint value from the reference variable w' through a further differential element 306 for the dancer roller 202. The values which result from this are transferred to a second differential element 307. From these differences and with consideration of the values of the P controller, the PI controller generates the actuating variable u as an input variable for the torque of the drive 201. This is a dynamic variable which is determined, in particular, from the differences of the setpoint/actual position and speeds $\phi_1$ and $d\phi/dt_1$ and therefore as an actuating moment gives information about the forces on the dancer 202 which guides the film web 2.

The forces which act only on the film web 2 are determined with the aid of pilot control operations which supply the proportion of the forces that is required only for the movement of the dancer 202. In rotatory coordinates, they are added as moments at the output of the cascade controller 301.

The pilot control operation, which compensates for the deterministic dynamic forces, is contained in a pilot control block V 325 which is supplied with a modified setpoint position w'. Pilot control operations are required for the moments of inertia $J_1$ and $J_2$ and the frictional moments $T_{viskos}$ and $T_{Coulomb}$ of the dancer carriage. The pilot control operations and the cascade controller correspond to transfer elements known from control technology and do not require any additional explanation herein. In particular, however, the use of the pilot control operations is a precondition for the function of the configuration.

This dynamic variable, obtained in this way, of the torque of the drive 201 as the actuating variable u is transferred for evaluation to a detection element 308 which, according to a predefined algorithm, determines from this torque variable the disturbance variable z* as an estimated variable for the disturbance variable of the control system 200 which represents the web force that acts on the dancer.

The block G 308, which is shown in FIG. 5, contains the transfer function for determining the web force.

The compilation of the differential equations of the mechanical system of FIG. 4 in conjunction with the control circuit of the control circuit system of FIG. 5 leads to the web force $z=T_{Web\ force}$, the estimated value z* of which is shown herein as a transfer function in the Laplace domain.

The moment which is generated by the web force on the dancer results from:

$$z^* = -T_1 \frac{s*T_N*(A*C-B^2)+K_P*(1+s*T_N)*C*(s+K_V)}{K_P*(1+s*TN)*B*(s+KV)},$$

wherein the cascade control has been modeled as follows:

Rotational speed controller $K_P*(1+s*T_N)/(s*T_N)$ with dimension 1, with the boost $K_P$ and the reset time $T_N$ position controller $K_V$ [1/s]

with the boost $K_V$

The abbreviations A, B and C have been used from the differential equations for the following expressions:

$$A=s^2*J1+s*D_K+C_K$$

$$B=s*D_K+C_K$$

$$C=s^2*J2+s*D_K+C_K$$

While the actually acting web force z acts as a disturbance variable on the control system 200, the detection element 308 outputs an estimated web force z* on the basis of a stored algorithm from the dynamic stipulation of the torque as an input variable or actuating variable u of the control system 200, which estimated web force z* is firstly forwarded to an output 309, with it being possible for this value to be indicated through the output 309 or to be used for further steps, such as an emergency shutdown of the transfer film unit 1 if limiting values are exceeded.

The estimated web force z* is output further to a setpoint value modifier 310. The latter obtains a setpoint value w from a setpoint value generator 311 as a stipulation for the reference variable w' which represents a value for the setpoint position of the dancer or the angular position $\phi_1$ of the drive 201 of the dancer 202. The predefined setpoint value w of the setpoint value generator 311 is then modified through the setpoint value modifier 310 as a function of the estimated web tension z* in such a way that an adapted reference variable w' is produced which is suitable for not allowing the web tension to rise over time above a predefined threshold value. For this purpose, in particular, the temporal profile of the estimated web force z* can be used to adapt the modified reference variable w' correspondingly as a function of the temporal profile, that is to say the temporal derivation of the estimated web force.

For this purpose, for example in the case of a critical rise in the web force, a sinusoidal curve can be superimposed on the setpoint value w, which sinusoidal curve makes the setpoint value steeper before the occurrence of the critical rise, in order to then reduce the steepness of the setpoint curve during the critical rise. Due to the periodicity of the web force fluctuations, the determination of the correct instant does not represent a problem. It goes without saying that the setpoint value modification may take place only outside the sectors of the synchronous run for transferring the transfer layer.

As already described, the difference between the setpoint value and the actual value of the dancer position or the angular position of the drive 201 of the dancer 202 is then determined through the differential element 304 and is transferred into the P controller. Since the estimated web force z* is proportional to the web tension, a rise in the web tension z or the web force z over a given value or too rapid a change in the web force can be avoided dynamically in this way.

Figure 6:
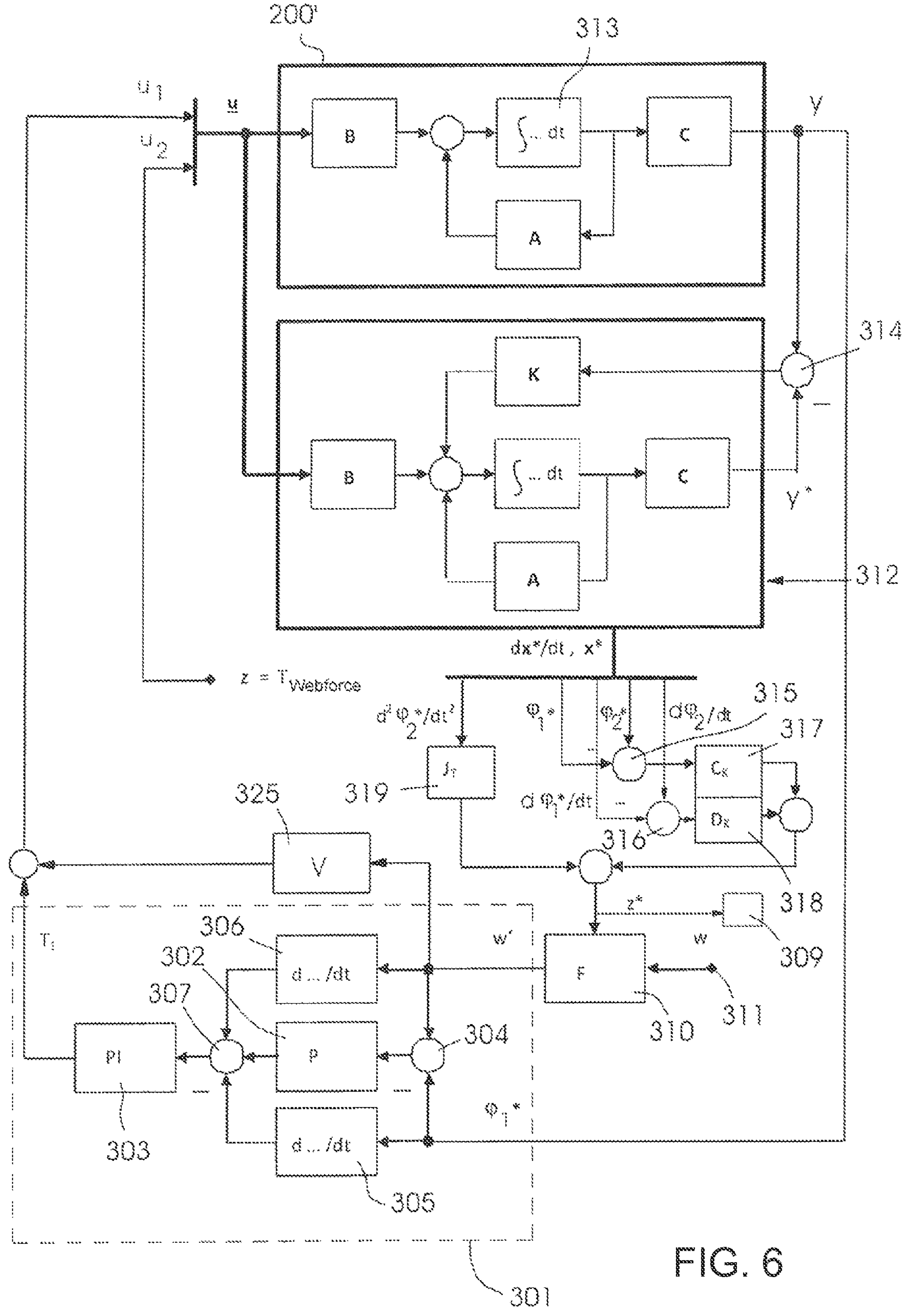
FIG. 6 is a basic block diagram of the control system according to FIG. 5, upgraded with an observer.

Like FIG. 5, FIG. 6 also shows a basic illustration of a control system, in which the web tension or the web force z, which acts as a disturbance variable on the system, can be controlled to such an extent that it cannot exceed predefined values or its derivation cannot exceed predefined values.

For this purpose, in addition to the elements previously shown in FIG. 5, an observer 312 is introduced in FIG. 6. The observer 312 shown herein acts according to a standard method known from control technology. In contrast to the control system shown in FIG. 5, the block G 308 is omitted as a result, since it is replaced by the observer 312.

In this case, a control system 200' is shown as a configuration of matrices A, B, C and an integrator 313. The observer 312 contains the matrices A, B, C which are provided identically in the same way as those of the control system. In addition to the integrator and the matrices, it has a matrix K which is known generally from control technology for the construction of an observer. The observer 312 and the control system 200' are a representation in state space. The process parameters, such as spring constant $C_K$, damping constant $D_K$, moment of inertia I, etc., are contained in the matrices of the observer 312 and the control system 200'. The process parameters have to be detected and determined in a preceding method step, in so far as they are not predefined structurally. The matrices A, B, C are determined by the differential equations being compiled, starting from the physical functional principle of FIG. 4, and then being transferred into the matrix representation.

A system of the fourth order results with two mass points, spring and damping.

A=[0, 1, 0, 0;
−CK/JM, −DK/JA, CK/JA, DK/JM;
0, 0, 0, 1;
CK/JT, DK/JT, −CK/JT, −DK/JT]
B=[0, 0;
1/JM, 0;
0, 0;
0, 1/JT]
C=[1, 0, 0, 0]

The matrix K determines the dynamics of the observer and is determined, for example, by pole prescription. In this regard, reference is made to the technical literature.

In this basic illustration, the web force z which is not known in the real process and acts as a disturbance variable and the predefined torque u1 for the drive 201 of the dancer roller 202 are predefined as actuating variables u1, u2. As an alternative, the actuating variable can be represented herein, in particular, as a vectorial variable $\underline{u}$. The actuating variable $\underline{u}$ is input both into the control system 201 and into the observer 312. While a resulting actual variable y is output from the control system 201 as a position $\Phi_1$ of the drive 201, the observer determines an estimated actual variable y* on the basis of the process parameters. The difference of the values is passed back to the observer 312 into the matrix K through a differential element 314. As already specified further above, it is sufficient to determine the matrix K by way of the process of pole prescription. By an iterative process in the observer 312, state variables which are generally described as x* or its derivations dx*/dt are subsequently adapted to such an extent, until the difference of the actual value y to the estimated actual value y* is 0. The observer then determines the positions $\phi_1$*, $\phi_2$* and their derivatives as estimated values of the state variables. The web force z* is calculated from $\phi_1$*, $\phi_2$*, d$\phi_2$/dt and d2$\phi_2$/dt with the aid of the differential elements 315 and 316 and the detection elements 317, 318 and 319, in which the state variables are multiplied by the system parameters cK, dK and JT. The calculated web force is also transferred in this case in the form of the estimated disturbance variable z* into a setpoint value modifier 310. The setpoint value modifier 310 determines, as already described above, a modified reference variable w' which is transferred to the control circuit 301. As already described with regard to FIG. 5, the actuating variable u1 is determined for the torque of the drive 202 in the control circuit 301. As a difference from the embodiment described with regard to FIG. 5, the actuating variable u is not used directly in this case to determine the web tension.

Moreover, in contrast to the method according to the embodiment of FIG. 5, the pilot control device is not required to determine the web tension. The control improvement as a result of pilot control operations is to be unaffected thereby.

Identical elements are described herein by using designations which are identical to those described with regard to the previous figures.

The differentiating transfer element G 308 of the embodiment according to FIG. 5 is avoided due to a higher expenditure for computing technology.

Moreover, the general state variables x*, dx*/dt and $d^2x^*/dt^2$ which supply a more accurate and almost delay-free estimated web force as the disturbance variable z* through corresponding detection elements 317, 318, 319 are determined with the assistance of the observer 312. This iteratively approximated estimated value for the disturbance variable web force or the web tension proportional thereto also result in more exact possibilities to influence them. At least the measures described in the embodiment according to FIG. 5 can also be taken by way of this estimated value. In this way, the web tension can be regulated or limited in a simple way or fluctuations therefrom can be minimized. Accordingly, an output 309 is also additionally possible.

Figure 7:
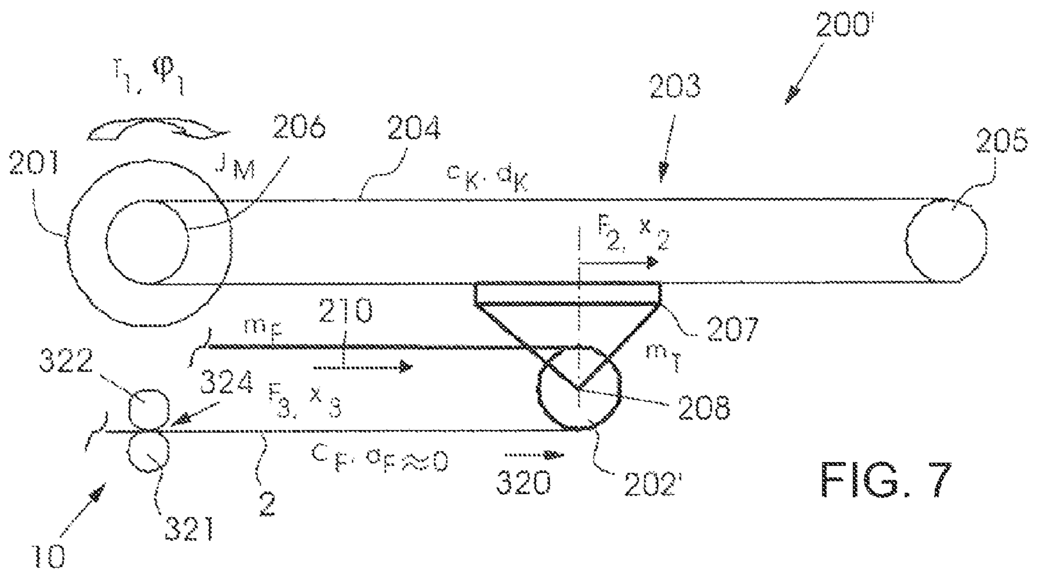
FIG. 7 is a physical sectional view of a control system with the film web as an element of the control system.

As a further alternative embodiment of the invention, FIG. 7 shows a further mechanical diagram of a control system 200', in which the film web 2 itself also becomes a constituent part of the control system as a discrete element. In this case too, identical elements have been provided with identical designations, as in the previous drawings. This is not an illustration of the front dancer 13 of the film transfer unit 1, but rather an illustration of the rear dancer 12 of the film transfer unit 1. The rear advancing device 10 with the advancing rollers 321 and 322 is shown herein, in particular. Those advancing rollers 321 and 322 have a nip 324, in which the film web 2 is clamped.

The method which is shown in FIG. 7 and will be described in the following text is used to solve the problems occurring as a consequence of web tension fluctuations at the rear dancer system, which are caused by the synchronization of the front dancer.

Since FIG. 7 represents only a basic view of a configuration of this type, no particular attention is paid to the exact configurations of the individual elements of the real dancer system. This principle can therefore be used universally, as a result of which a movement direction 320 of the film 2 around the dancer 202' is also not relevant for the physical function.

In this case, however, the advancing device is important for the description of the control system. An approximate modeling of the film can be performed by way of a jamming point of the advancing device as a concentrated coupled mass element which is produced only due to a film segment that faces away from the advancing device and is moved by the dancer, emphasized in bold in FIG. 7. The entire mass, the speed of which is changed by the dancer, is therefore to be taken into consideration. The superimposed film movement, which is not caused by the dancer, has no functionally relevant influence in this case.

As described with respect to FIG. 3, the movement of the dancer 202' in the direction of the force $F_2$ at the position $x_2$ brings about a force $F_3$ on the film web with an associated position $x_3$. Since it acts in each case on a partial section of the films at the upper region of the dancer 202' and at the lower region of the dancer 202', this film force is in each case half as large as the force $f_2$ which acts on the dancer. The same process parameters $c_K$ and $d_K$ as described with regard to FIG. 3, are also present in this case. The functional principle becomes clearer, however, by a view from the film 2, the web force of which reacts on the dancer. In addition, the process parameters $c_F$ and $m_F$ have to be determined quantitively in this case as a concentrated spring constant and mass, for example by measurements or numerical methods. The damping constant $d_F$ can be neglected. For the dynamic analysis, the transfer film 2 is considered at least from the nip 324 which acts as a point of separation and represents a limit. The dancer roller 202' mainly moves a film section 210 which is affected with mass and of which only a partial region is shown herein. The parameter $m_F$ identifies the film mass in this case. In the further course of the film, as a rule further guide elements are required which are also not shown herein but likewise represent a limit in the context of the dynamic analysis.

Jamming points, points with great friction or deflection rollers with great mass, which are accelerated by the film 2, can also act as points of separation. Deflection rollers with lower mass can be added to the film mass if they run substantially synchronously with respect to the web. As has already been described further above, it is not necessary that the parameters have to be determined exactly because the control method is always convergent. However, the accuracy of the parameters $c_F$, $m_F$ influences the settling duration of the internal process variables and therefore the reaction time of the dancer 202' in order to minimize the dynamic web forces. For example, the effective mass $m_F$ can be determined from the ground layer of the film 2, and is a fraction of the overall mass in the case of elastic expansion as in a spring.

In order for it to be possible to treat all the state variables from the control system 200' identically, they are converted in an analog manner into rotatory parameters, as described with regard to FIG. 4. This is shown symbolically in FIG. 8. In this case, the negligible damping constant $D_F$ of the film 2 in rotatory coordinates has been carried over formally and the spring in the rotatory system has the spring constant $C_F$. The web force of the film is converted in an analog manner into a torque $T_3$ and its position is converted into an angle $\phi_3$, while its effective mass $m_F$ is converted into a moment of inertia $J_F$. This is shown by a parameter set 325. As in FIG. 3, a parameter set 213 is shown for the drive 201. In this case, an index M has been used as a moment of inertia for the drive 201. The same is true of the parameter set 214' which has an index T as an index for the moment of inertia of the dancer. In this case, in addition, viscous and Coulomb friction forces are or can also be taken into consideration as process parameters.

Figure 9:
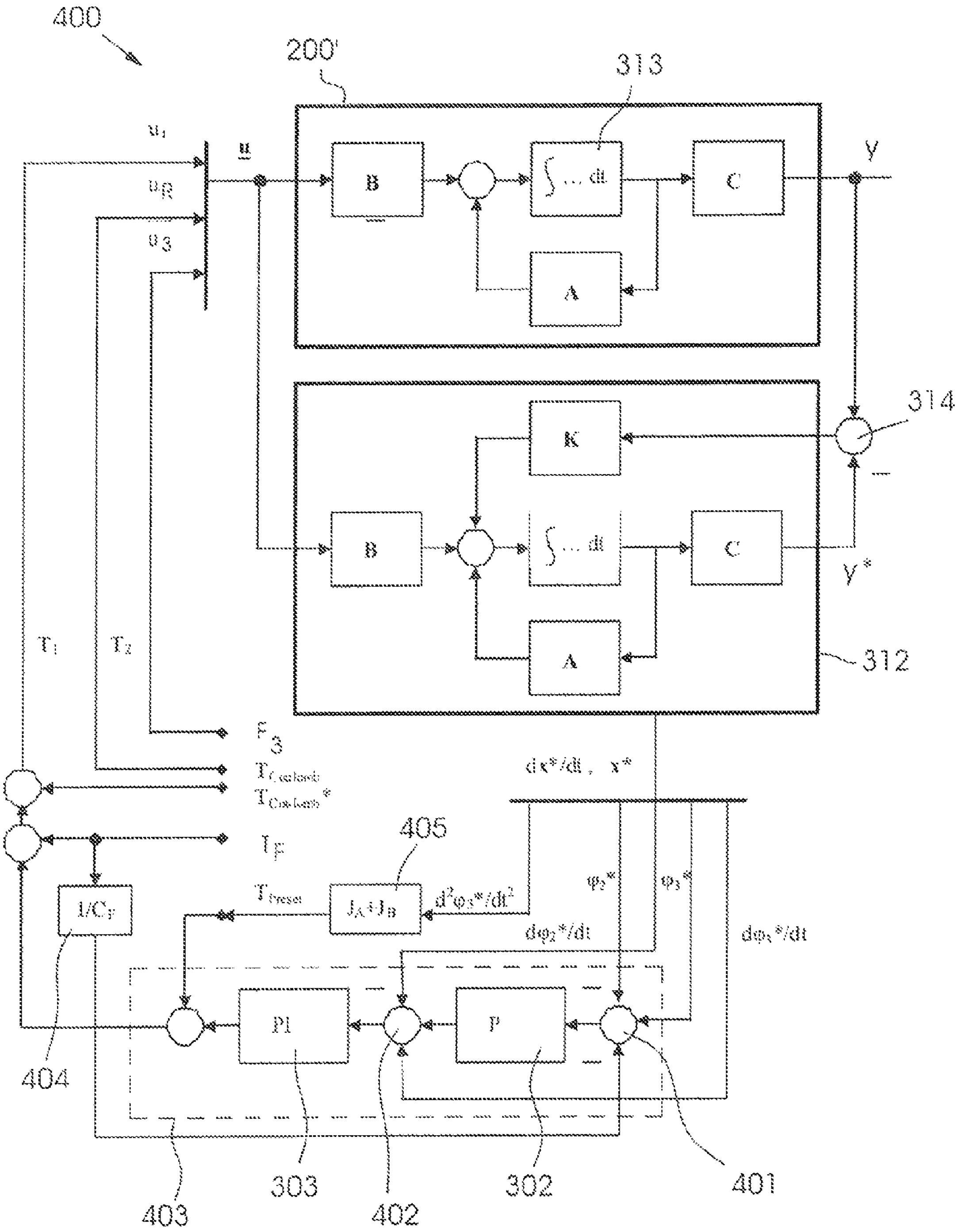
FIG. 9 is a basic block diagram of a control system for reducing the web tension which reacts on the dancer.

Starting from this description of the different process parameters in rotatory coordinates, FIG. 9 shows a basic illustration of a control system 400 which minimizes the web force $F_3$ that reacts on the dancer 202', with the result that the drive 201 substantially moves the dancer 202' and the latter follows the web movement as if no dynamic web force $F_3$ acts on the dancer 202'. As already described, a desired web force $T_F$ can be engrained constantly or else with a profile, in a superimposing manner for stable operation.

Identical elements are also shown in this case with designations that are identical to those used in previous drawings.

Thus, the extended control system 200' is also shown herein in the state space representation, in order to ensure that it can be used for the observer 312. An iterative loop is also used in this case through the differential element 314, in order to output the estimated state variables $x^*$, $dx^*/dt$ and $d^2x^*/dt^2$ for the control system 200' as accurately as possible as estimated variables from the observer 312.

Figure 8:
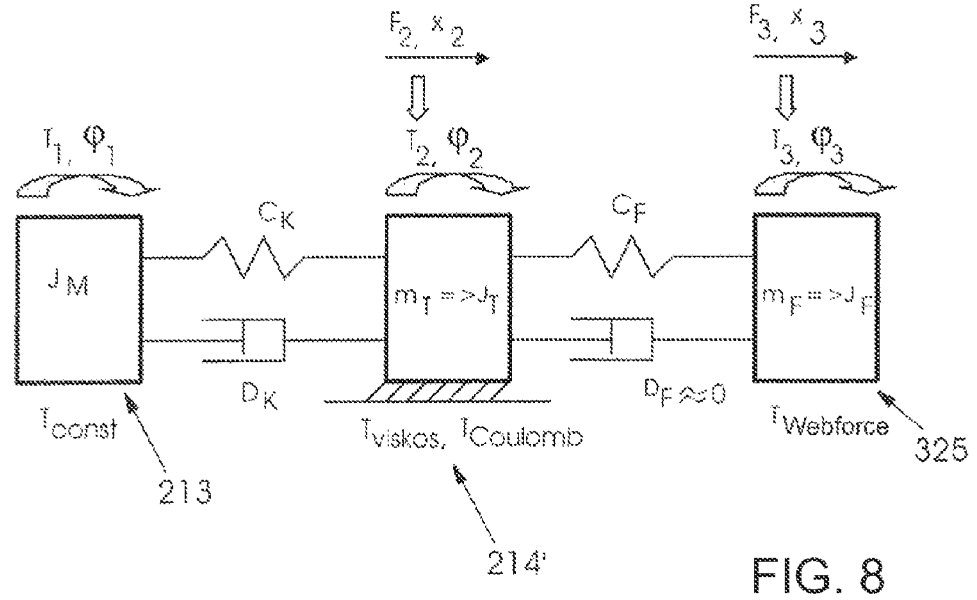
FIG. 8 is a block diagram of the physical system according to FIG. 7 with rotatory parameters.

The matrices A, B and C are also determined in this case, starting from the physical functional principle of FIG. 8, by the differential equations being compiled and then transferred into the matrix representation.

A system of the $6^{th}$ order results with three mass points, spring and damping.

A=[0, 1, 0, 0, 0, 0;
−CK/JM, −DK/JA, CK/JA, DK/JM, 0, 0;
0, 0, 0, 1, 0, 0;
CK/JT, DK/JT, −(CK+CF)/JT, −(DK+DF)/JT, +CF/JT, +DF/JT;
0, 0, 0, 0, 0, 1;
0, 0, CF/JF, DF/JF, −CF/JF, −DF/JF]
B=[0, 0, 0;
1/JM, 0, 0;
0, 0, 0;
0, 1/JT, 0;
0, 0, 0;
0, 0, 1/JF]
C=[1, 0, 0, 0, 0, 0]

Matrix components are separated by a comma and lines by a semicolon.

The matrix K determines the dynamics of the observer and can likewise be determined by pole prescription in this case.

Reference is made to the fact that, according to the invention, a simplified configuration with only two mass points is also possible, in which the film force $F_3$ acts in an exemplary manner through a spring on the dancer roller 202'. This spring is a replacement element only for the physical modeling of the force action on the dancer 202'. A replacement position of the film 2 can therefore be calculated in a simplified manner from the force $F_3$ and spring constant $c_F$, in order to act as a setpoint value. The spring constant $c_F$ can be considered to be notional and can be varied within a wide range because the control device in every case minimizes the difference between replacement positions of the film 2 and the position of the dancer 202'.

The principle of the advantageous actuation of the dancer roller 202' for minimizing the dynamic web forces, as already explained above, does not necessarily have to take place without the addition of further sensors. For example, a sensing roller with force sensors can detect the web force directly. The measured value which is thus available can be processed further with consideration of the dynamic properties of the sensing roller, in order, for example, to damp natural frequencies in the signal. By way of the measured value which has been processed in this way, the web tension can be controlled directly through a regulating system to predefined setpoint values, by the controller being loaded with the setpoint/actual value difference. Cascade controllers and the usual pilot control operations and/or observers can also be used in this case, which feed the actuating moment to the drive 201'.

Reference has already been made to the disadvantages of the additional sensors.

The results which can be achieved with these simplified models and/or configurations have a poorer dynamic response. Therefore, only the construction with three mass points will be considered in the following text.

In contrast to the regulating system according to FIG. 6, the state variables $d^2\phi_3^*/dt^2$, $d\phi_{2,3}^*/dt$ and $\phi_{2,3}^*$ are not used in this case to determine the disturbance variable z* of the web force which reacts on the dancer 202', but rather to carry out compensation control with setpoint and actual values which are removed from the observer 312. As another difference from the alternative embodiment of the invention, where the web tension is determined from the actuating variable of the controller, the controller in this case is therefore a constituent part of the regulating system 400 for the dynamic compensation of the web forces $F_3$ on the dancer 202'.

In order to minimize as far as possible the web force $F_3$ which acts on the dancer roller 202', the state variables $\phi_2^*$ and $\phi_3^*$ which describe the angular positions of the dancer 202' and film web 2 are introduced in this case into the known P controller 302 through a differential element 401 of a control circuit 403. The state variable $\phi_3^*$ which describes the position of the film 2 is used in this case as a reference variable, that is to say as a setpoint value for the actual position $\phi_2^*$ of the dancer 202'. It is then the object of the control circuit 403 to allow the difference at the P controller between $\phi_2^*$ and $\phi_3^*$ to move toward 0. In this case, the physical effect is then achieved that the dancer 202' tracks the film 2 accurately, with the result that a force action $F_3$ of the film 2 on the dancer 202' no longer exists and the dancer 202' can be moved as if it were without force.

In order to improve the control property, the derivations $d\phi_2/dt$ and $d\phi_3/dt$ of the positions of the dancer 202' and the film 2 are then transferred further through the differential element 402 as differential speed into the PI controller 403, as is already known from FIG. 6. This also results in a torque u1 for the drive 201 as an actuating variable or input variable for the control system 200'.

A pilot control moment for the nonlinear Coulomb friction $T_{Coulomb}^*$, for example in the form of a characteristic curve which is not shown in FIG. 9, should also be added in this case as further actuating variables of the torque u1, to improve the control operation. A pilot control operation of the viscous friction (not shown in FIG. 9) contributes to the improvement of the control operation only to a relatively small extent.

In addition, a web force to be predefined, denoted as a moment $T_F$ in this case, can be superimposed as already described to the desired web force $F_3$ as an extension in the control operation in such a way that a common actuating variable $u_1$ results for the control system 200':

This superimposed web force as an extension produces a positional displacement of the modeled web mass, the resulting control deviation of which produces the required countermoment with respect to the web force.

Apart from being taken into consideration within the observer 312 and the control system 200', the spring constant $C_F$ of the film 2 is also used for this purpose. The moment $T_F$, specified in this case in rotatory coordinates, is transferred back to the input of the P controller 302 through a quotient element 404 which contains $C_F$, with the result that a corresponding positional deviation of the dancer mass is subtracted at the controller input.

The real process variables of the system contain the friction $T_{Coulomb}$, $T_{viskos}$ and correspondingly the desired web force $T_{Webforce}$ which have to be modeled correspondingly in FIG. 8 for the control system.

In the example shown herein, the real web force $F_3$ in rotatory coordinates is shown as an input variable u3 of the control system 200', just like the friction of the dancer carriage $T_{Coulomb}$, since the resulting forces form section forces with respect to the surroundings, as can be seen in FIG. 9.

A particular knowledge of this force is not necessary, since corresponding values for the position $\phi_2^*$ of the dancer 202' and the position $\phi_3^*$ of the film 2 are estimated through the observer 312. The difference, that is to say the fluctuations in this position, are then minimized further and further in the course of the control circuit 403, with the result that, independently of the actually acting web force $F_3$, only a torque $u_1$ has to be input to the drive 201 of the control system 200'.

In order to further improve the transient response of the control system 200', additionally a further pilot control element 405 is also provided which obtains from the observer 312 an estimated value $d^2\phi_3^*/dt^2$ for the acceleration of the overall mechanics, and applies an expected necessary torque as a pilot control value $T_{Preset}$ as a function of the effective moments of inertia $J_A$ and $J_B$ of the drive 201, the dancer 202' and the coupling elements 203 and transfers it to the output of the control circuit 403.

As a result of this depicted construction of the regulating system 400, the web tension can therefore already be controlled in advance by compensation of the reactive web forces $F_3$ which are caused by the synchronization and stipulation of a desired web tension, by the dancer 202' followed by the drive 201 and control of the film 2. A separate determination of the web force $F_3$ is not necessary for this purpose.

During the phases of the synchronization with synchronous running for transferring the transfer layer onto the printing material 21, the control operation just described can be stopped and the drive can obtain external setpoint values for synchronous running.

In all of the cases shown herein, an extra sensor for determining the web force and/or the web tension is not necessary. An extra sensor results in costs and, depending on the embodiment, it would also always react on the web 2, with the result that it could also itself lead to falsifications of the parameters for the control operation. As a result of such a sensor, reductions in quality could also occur as a result of its action on the running of the film 2.

The invention claimed is:

1. A method for at least partially transferring a transfer layer from a transfer film onto a printing material, the method comprising the following steps:

guiding the transfer film and the printing material together through a transfer nip for releasing the transfer layer from a carrier layer of the transfer film under action of pressure and transferring the transfer layer onto the printing material;

unwinding the transfer film from a supply reel and guiding the transfer film to the transfer nip with at least one first actuating element upstream of the transfer nip in a movement direction of the transfer film and/or transporting the transfer film away from the transfer nip with at least one second actuating element downstream of the transfer nip in the movement direction of the transfer film;

substantially following a predefined movement profile and providing an active effect on the transfer film with the first actuating element for at least intermittently varying an advancing speed of the transfer film and/or adjusting the second actuating element as a function of web movement;

acting on the movement profile of at least one of the actuating elements with a control system including a control circuit;

mapping a first process variable in the control circuit, the first process variable being a function of a force acting on at least one of the actuating elements as a result of the transfer film or being a function of an actual current movement profile of the at least one actuating element; and calculating a measure of a web tension as a function of the first process variable and/or at least limiting an amplitude of the web tension with the control system.

2. The method according to claim 1, which further comprises:

providing a first disturbance variable of the control circuit as a function of the web tension, or at least of changes in the web tension of the transfer film;

calculating the first process variable as a function of the first disturbance variable; and deriving an evaluation variable representing a measure of the web tension of the transfer film from the first process variable.

3. The method according to claim 1, which further comprises:

determining a measure of the web tension as a function of the first process variable; and determining a dynamic and/or static proportion of the web tension substantially without sensors.

4. The method according to claim 3, which further comprises:

predefining a setpoint value of the at least one actuating element in the control system;

deriving an evaluation variable, being a measure at least of the dynamic proportion of the web tension, from the first process variable;

comparing the evaluation variable with a reference variable; and adapting the setpoint value and/or changes in the setpoint value as a function of a result of the comparison.

5. The method according to claim 4, which further comprises:

determining an estimated value of the first process variable with an observer;

feeding the estimated value of the observer, for determining a modified setpoint value, to a filter element for applying at least one filter function and/or one transfer function; and changing the movement profile of the first actuating element due to the modified setpoint value, resulting in the web tension not exceeding a predefined limiting value.

6. The method according to claim 1, which further comprises:

providing an actuating element system including at least the first actuating element, the second actuating element downstream of the transfer nip in the movement direction of the film, at least one drive motor of at least one of the actuating elements, the transfer film and mechanical connecting and transfer elements between the actuating elements, the at least one drive motor and the transfer film;

determining the process variable at least partially with an observer;

determining, with the observer, at least one estimated value for state variables from a set including angular velocity and angle of the at least one drive motor of at least one of the actuating elements and a shaft of the actuating elements and the transfer film of the actuating element system;

providing a rotary encoder in vicinity of at least one drive motor of at least one of the actuating elements;

determining values for the rotary angle of the at least one drive motor with the rotary encoder;

transferring an actuating variable of a controller of the control circuit of the control system to the observer;

determining the estimated values of the state variables with the observer under consideration of the values of the rotary encoder, the actuating variable and a model of mechanics of the actuating element system;

feeding the determined estimated values as setpoint values to the controller of the control circuit; and minimizing fluctuations in a force action of the film at least on the second actuating element.

7. The method according to claim 6, which further comprises predefining a value for the web tension of the transfer film as offset as a reference variable of the control system, resulting in the web tension being superimposed as a constant force action of the film on the second actuating element to form the minimized fluctuations.

8. The method according to claim 7, which further comprises predefining a dynamic profile for the offset.

9. The method according to claim 1, which further comprises:

providing an actuating element system including at least the first actuating element, the second actuating element downstream of the transfer nip in the movement direction of the film, at least one linear motor of at least one of the actuating elements, the transfer film and mechanical connecting and transfer elements between the actuating elements, the at least one linear motor and the transfer film;

determining the process variable at least partially with an observer;

determining, with the observer, at least one estimated value for state variables from a set including velocity and position of the at least one linear motor of at least one of the actuating elements and a shaft of the actuating elements and the transfer film of the actuating element system;

providing a linear position encoder in vicinity of at least one linear motor of at least one of the actuating elements;

determining values for the position of the at least one linear motor with the linear position encoder;

transferring an actuating variable of a controller of the control circuit of the control system to the observer;

determining the estimated values of the state variables with the observer under consideration of the values of the linear position encoder, the actuating variable and a model of mechanics of the actuating element system;

feeding the determined estimated values as setpoint values to the controller of the control circuit; and minimizing fluctuations in a force action of the film at least on the second actuating element.

10. The method according to claim 6, which further comprises minimizing the web tension fluctuations or defining the offset of the web tension exclusively in time periods outside phases in which the advancing speed of the film corresponds to a speed of the printing material in the transfer nip during the film transfer.

11. The method according to claim 7, which further comprises minimizing the web tension fluctuations or defining the offset of the web tension exclusively in time periods outside phases in which the advancing speed of the film corresponds to a speed of the printing material in the transfer nip during the film transfer.

12. The method according to claim 8, which further comprises minimizing the web tension fluctuations or defining the offset of the web tension exclusively in time periods outside phases in which the advancing speed of the film corresponds to a speed of the printing material in the transfer nip during the film transfer.

13. The method according to claim 9, which further comprises minimizing the web tension fluctuations or defining the offset of the web tension exclusively in time periods outside phases in which the advancing speed of the film corresponds to a speed of the printing material in the transfer nip during the film transfer.

* * * * *